United States Patent [19]

Garner et al.

[11] 3,995,088

[45] Nov. 30, 1976

[54] COATED PRESSURE-SENSITIVE RECORDING MATERIAL

[75] Inventors: Robert Garner, Bury; John Barry Henshall, Manchester, both of England; Jean-Claude Petitpierre, Kaiseraugst, Switzerland

[73] Assignee: Ciba-Geigy Corporation, Ardsley, N.Y.

[22] Filed: Jan. 23, 1975

[21] Appl. No.: 543,580

[30] Foreign Application Priority Data

Feb. 1, 1974 United Kingdom................. 4688/74

[52] U.S. Cl................................ 428/323; 428/411; 428/454; 428/488; 427/146; 427/151; 428/537; 428/913; 282/27.5
[51] Int. Cl.[2]..................... B32B 5/22; B41M 5/12
[58] Field of Search........... 428/323, 411, 454, 488, 428/537; 427/146, 151

[56] References Cited

UNITED STATES PATENTS

| | | | |
|---|---|---|---|
| 2,755,202 | 7/1956 | Balon et al............................. | 117/36 |
| 2,828,342 | 3/1958 | Adams et al......................... | 260/570 |
| 2,900,388 | 8/1959 | Tien..................................... | 260/295 |
| 3,418,250 | 12/1968 | Vassiliades........................... | 252/316 |
| 3,427,180 | 2/1969 | Phillips, Jr. ......................... | 282/27.5 |
| 3,649,649 | 3/1972 | Orita et al........................... | 260/343.3 |

FOREIGN PATENTS OR APPLICATIONS

629,165 9/1949 United Kingdom

*Primary Examiner*—P. C. Ives
*Attorney, Agent, or Firm*—Joseph G. Kolodny; Edward McC. Roberts; Prabodh I. Almaula

[57] ABSTRACT

Pressure-sensitive copying material containing included in its Color-reactant system a mixture of at least two color formers, wherein at least one color former is a leuco methylene dyestuff of the formula

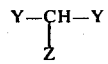
(1)

wherein Y represents an amino-substituted phenyl residue of the formula (1a)

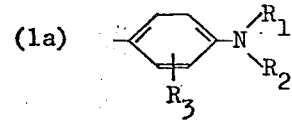

or an indolyl residue of the formula

1(b)

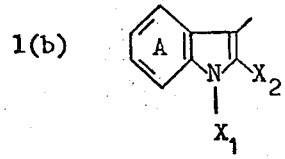

wherein $R_1$ and $R_2$, independently of the other represent hydrogen, alkyl with 1 to 12 carbon atoms, alkoxyalkyl with 2 to 8 carbon atoms, benzyl or phenyl, $R_3$ is hydrogen, halogen, nitro, alkyl having 1 to 4 carbon atoms or alkoxy having 1 to 4 carbon atoms, $X_1$ represents hydrogen, alkyl with 1 to 12 carbon atoms, alkenyl with at most 12 carbon atoms or benzyl, $X_2$ represents hydrogen, alkyl with 1 to 12 carbon atoms or phenyl and the ring A is unsubstituted or substituted by cyano, nitro, halogen, alkyl having 1 to 4 carbon atoms, alkoxy having 1 to 4 carbon atoms or acyl with 1 to 8 carbon atoms, and Z represents alkyl with 1 to 12 carbon atoms, alkenyl with at most 12 carbon atoms, aryl, aralkyl, an heterocyclic radical or the residue of an organic, particularly aliphatic or cycloaliphatic compound having a ketomethylene group.

15 Claims, No Drawings

COATED PRESSURE-SENSITIVE RECORDING MATERIAL

The present invention provides an improved pressuresensitive copying material containing included in its colour reactant system a mixture of at least two colour formers wherein at least one colour former takes the form of a leuco methylene dyestuff.

In the prior art Benzoyl Leuco Methylene Blue, related derivatives of phenothiazine, and analogous compounds derived from phenoxazine have been put forward as suitable slow developing colour formers for use in pressure-sensitive copying systems in combination with further suitable instant chromogenic compounds.

The classical combination of chromogenic compounds used in pressure-sensitive copying systems is a mixture of Crystal Violet Lactone and Benzoyl Leuco Methylene Blue. The Crystal Violet Lactone is responsible for providing the initial image which, however, is very unstable to light and moisture. This defect is overcome by the use of Benzoyl Leuco Methylene Blue which develops slowly by initiation with light, providing a greenish-blue image to replace that of the fading Crystal Violet Lactone and which is extremely light stable. However, this image suffers the disadvantages of being rather green in tone, lacking in contrast and hence not very efficient when a multiple series of copies are required. It is also not copyable by means of the commercially available reprographic machines.

It is the object of the invention to provide pressure-sensitive copying material containing new mixtures of chromogenic compounds with spectral characteristics in which all the desired properties are met, for example good lightfastness involving little or no tonal change on prolonged exposure, together with good stability to moisture and good copyability at all stages in the lifetime of the developed image.

This is provided by a pressure-sensitive copying material containing included in its colour-reactant system a mixture of at least two colour formers wherein at least one colour former is a leuco methylene dyestuff of the formula

wherein Y represents an amino-substituted phenyl residue of the formula

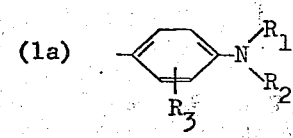

or an indolyl residue of the formula

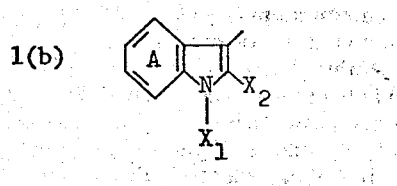

wherein $R_1$ and $R_2$, independently of the other, represent hydrogen, alkyl with 1 to 12 carbon atoms, alkoxyalkyl with 2 to 8 carbon atoms, benzyl or phenyl, $R_3$ is hydrogen, halogen, nitro, alkyl having 1 to 4 carbon atoms or alkoxy having 1 to 4 carbon atoms, $X_1$ represents hydrogen, alkyl with 1 to 12 carbon atoms, alkenyl with at most 12 carbon atoms or benzyl, $X_2$ represents hydrogen, alkyl with 1 to 12 carbon atoms or phenyl and the ring A may be further substituted by cyano, nitro, halogen, alkyl having 1 to 4 carbon atoms, alkoxy having 1 to 4 carbon atoms or acyl with 1 to 8 carbon atoms, and Z represents alkyl with 1 to 12 carbon atoms, alkenyl with at most 12 carbon atoms, aryl, aralkyl, an heterocyclic radical or the residue of an organic, especially aliphatic or cycloaliphatic, compound having a ketomethylene group.

When the radicals $R_1$, $R_2$, $X_1$ and $X_2$ represent alkyl, they may be straight or branched chain alkyl groups. Examples of said alkyl groups are methyl, ethyl, n-propyl, isopropyl, n-butyl, sec.-butyl, hexyl, octyl or dodecyl. Alkoxyalkyl in $R_1$ and $R_2$ may have 1 to 4 carbon atoms in each alkyl part and stands preferably for β-methoxyethyl or β-ethoxyethyl. Alkenyl in $X_1$ stands e.g. for allyl, 2-methallyl, 2-ethylallyl, 2-butenyl or octenyl.

$R_1$, $R_2$ and $X_1$, independently of the other, are preferably methyl, ethyl or benzyl, whereas a preferred $X_2$-radical is methyl, ethyl or phenyl. $R_3$ is preferably hydrogen, methyl, methoxy or chlorine and the benzene ring A is desirably not further substituted. As preferred substituents the ring A may contain halogens, nitro, methyl or methoxy.

As an alkyl or alkenyl radical Z may have the same meanings as given for the R- and X- radicals, either of which is preferably substituted by an aryl radical e.g. phenyl, to form thus an aralkyl group having preferably 1 to 4 cabon atoms in the aliphatic moiety, such as benzyl, piperonyl or styryl groups.

The aryl radical in the meaning of Z may be phenyl, diphenyl or naphthyl. These aromatic carbocycles can contain halogen, cyano, nitro, alkyl and/or alkoxy each having 1 to 4 carbon atoms, methylenedioxy, dialkylamino having 1 to 4 carbon atoms for each alkyl moiety, or acyl with 1 to 8 carbon atoms. Among the acyl group the alkanoyl groups containing 2 to 4 carbon atoms such as acetyl or propionyl are especially noteworthy. Examples of these aromatic radicals include phenyl, o-, m- or p-methylphenyl, o-, m- or p-methoxyphenyl, o-, m- or p-chloro-, -bromo-or -fluorophenyl, o-, m- or p-nitrophenyl, 3,4-dimethoxyphenyl, 3,4-dichlorophenyl, 3,4-methylenedioxyphenyl, or naphthyl.

As heterocyclic radical, Z represents mainly a 5- or 6-membered, particularly oxygen, sulphur- or nitrogen-containing heterocycle of aromatic character. Examples of said heterocycles include thienyl, furyl, pyrrolyl, triazolyl, pyrazolyl, pyrazolonyl, pyridyl, thiazinyl or oxazinyl. In this respect, Z may also represent a radical derived from polynuclear condensed heterocycles; those preferably contain a fused benzene or naphthalene ring and are for example a optionally substituted benzothiophene, indole, indazole, benzothiazole, benzotriazole, naphthotriazole, quinoline, carbazole, phenothiazine or phenoxazine residue.

These mono- or polynuclear heterocyclic radicals can contain the substituents of the type listed above, particularly halogens, cyano, nitro, alkyl having 1 to 4 carbon atoms, alkoxy having 1 to 4 carbon atoms, acyl having 1 to 8 carbon atoms, or phenyl.

The preferred heterocyclic radicals represented by Z are 2-furyl, 2-thienyl, 4-pyridyl, 3-indolyl or 2-(N-methylpyrrolyl). As further examples of heterocyclic radicals Z can be named 1-phenyl-3-methyl-5-pyrazolon-4-yl, 1-phenyl-3-methyl-5-amino-pyrazolyl, 1-methyl-2,4-dioxo-quinolinyl, 1-acetyl-3-indolyl and 1-ethyl-2-methyl-3-indolyl.

As residue of compounds having a ketomethylene group represented by Z, both those containing the group in open chain as well as those in which it forms a component of a carbocyclic ring can be mentioned. Examples of compounds containing the ketomethylene group in open chain are cyanoacetic acid alkyl or phenyl esters or amides, 1,3-diketones such as acetylacetone, malonic acid alkyl or phenyl esters or amides, acyl acetic acid derivatives such as acetoacetic acid alkyl or phenyl esters or amides in which the phenyl moiety may be substituted by methyl, methoxy, ethoxy, cyano, halogen and/or nitro, or benzoyl acetic acid anilide. Examples of compounds containing the ketomethylene group in a carbocyclic ring are cyclic 1,3-diketones such as 1,3-indandione or 5,5-dimethyl-1,3-diketo-cyclohexane.

Halogen, in each occurrence in the definition of the substituents listed above, preferably stands for fluorine, bromine or especially chlorine.

Practically important groups of the compounds of the formula (1) may be defined by the following formula

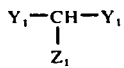

(2)

wherein $Y_1$ represents an amino-substituted phenyl residue of the formula

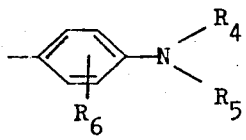

(2a)

or an indolyl residue of the formula

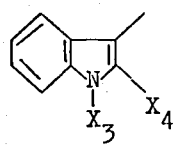

(2b)

wherein $R_4$ and $R_5$ independently of the other, represent hydrogen, alkyl havng 1 to 4 carbon atoms or benzyl, $R_6$ is hydrogen, methyl, methoxy or chlorine, $X_3$ represents hydrogen, alkyl with 1 to 12 carbon atoms or benzyl, $X_4$ represents hydrogen, methyl, ethyl or phenyl, $Z_1$ represents an aralkyl radical selected from benzyl, piperonyl and styryl, an aryl radical selected from phenyl, diphenyl or naphthyl, which may be substituted by halogen, methylenedioxy, nitro, alkyl having 1 to 4 carbon atoms, alkoxy having 1 to 4 carbon atoms or by dialkylamino having 1 to 4 carbon atoms per each alkyl part, or a heterocyclic radical, selected from furyl, thienyl, pyrrolyl, pyrazolyl, pyrazolonyl, pyridyl, thiazinyl, oxazinyl, indolyl, indazolyl, benzothienyl, benzothiazolyl, benzotriazolyl, naphthotriazolyl, quinolyl, carbazolyl, phenothiazinyl or phenoxazinyl, said mono- or polynuclear heterocycles may be substituted by halogen, cyano, nitro, alkyl with 1 to 4 carbon atoms, alkoxy with 1 to 4 carbon atoms or phenyl. Especially satisfactory results give those compounds of formula (2) wherein $Z_1$ represents a
1-phenyl-3-methyl-5-pyrazolonyl
1-phenyl-3-methyl-5-aminopyrazolyl or
1-methyl-2,4-dihydroxy-quinolinyl group, an indolyl residue substituted by alkanoyl having 2 to 4 carbon atoms, especially by acetyl at the nitrogen atom, or by alkyl having 1 to 8 carbon atoms, or represents the residue of an open or cyclic 1,3-diketone or of an acyl acetic acid phenylamide, bonded via the ketomethylene group.

Particularly valuable leuco methylene dyestuffs of the formulae (1) and (2) are those methylene dyestuffs which are listed under A, B, C and D, respectively. A. Arylene methylene compounds of the formula

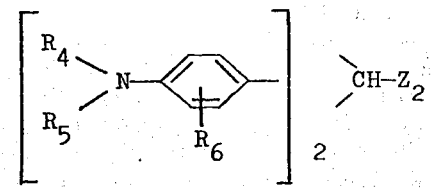

(3)

wherein $R_4$, $R_5$ and $R_6$ have the given meanings and $Z_2$ represents styryl, methylenedioxyphenyl, naphthyl or the group

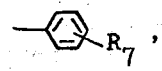

wherein $R_7$ represents hydrogen, halogen, nitro, methyl or methoxy and $R_6$ and $R_7$ do not simultaneously represent hydrogen when $R_4$ and $R_5$ are methyl.

Among these compounds of formula (3) $R_4$ and $R_5$ are desirably methyl, ethyl or benzyl and $Z_2$ is particularly methylphenyl, methoxyphenyl, nitrophenyl, 3,4-methylenedioxyphenyl, or also a phenyl group provided that $R_4$ and $R_5$ are not methyl and $R_6$ is not hydrogen. B. Arylene methylene compounds of the formula

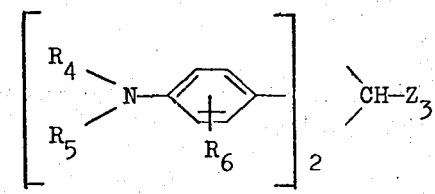

(4)

wherein $R_4$, $R_5$ and $R_6$ have the given meanings and $Z_3$ represents furyl, thienyl, pyridyl, pyrrolyl, or indolyl, wherein the pyrrolyl radical may be further substituted by alkyl, having 1 to 4 carbon atoms and the indolyl radical may be further substituted by alkyl having 1 to 4 carbon atoms, cyano, halogen, alkoxy having 1 to 4 carbon atoms or phenyl.

Within the above formula (4) $R_4$ and $R_5$ are preferably hydrogen, methyl, ethyl or benzyl, and $Z_3$ represents particularly furyl, thienyl, pyridyl, N-methylpyrrolyl or indolyl. Of the leuco diarylene methylene dyestuffs falling under formulae (3) and (4) those in which $R_4$ is hydrogen or benzyl, and $R_5$, $R_6$ and $Z_2$ or $Z_3$ have the given meanings or those in which $R_5$ is benzyl and $R_4$, $R_6$ and $Z_2$ or $Z_3$ have the given meanings or those in which $R_6$ is chlorine and $R_4$, $R_5$ and $Z_2$ or $Z_3$ have the given meanings or those in which $Z_3$ is furyl and $R_4$, $R_5$ and $R_6$ have the given meanings are particularly advantageous. The most preferred subclasses of compounds of formulae (3) and (4) are especially distinguished by the stability of the compounds on exposure to light and air in the absence of an electron-accepting co-relative substance. C. Indolyl methylene compounds of the formula (5) 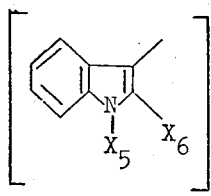

wherein $X_5$ represents alkyl with 2 to 8 carbon atoms or benzyl, $X_6$ represents methyl or phenyl and $Z_4$ represents styryl, phenyl or naphthyl, said phenyl radical may be substituted by halogen, methylenedioxy, nitro, methyl or methoxy.

Among these compounds of formula (5) $Z_4$ is particularly phenyl, methylphenyl, methoxyphenyl, nitrophenyl or styryl. D. Indolyl methylene compounds of the formula (6) 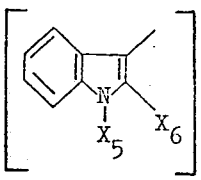

wherein $X_5$ and $X_6$ have the given meanings and $Z_3$ represents furyl, thienyl, pyridyl, pyrrolyl or indolyl, wherein the pyrrolyl radical may be further substituted by alkyl having 1 to 4 carbon atoms and the indolyl residue may be further substituted by alkyl having 1 to 4 carbon atoms, cyano, halogen, alkoxy having 1 to 4 carbon atoms, phenyl and particularly by acetyl at the nitrogen atom.

In this case $X_5$ is most preferably ethyl, $X_6$ is with advantage methyl and $Z_3$ represents particularly furyl, pyridyl, N-methyl-pyrrolyl or indolyl as well as 1-acetylindol-3-yl. These most preferred compounds falling under formula (6) are especially distinguished by their stability on exposure to light and air in the absence of an electron-accepting co-reactive substance. Further important groups of leuco methylene dyestuffs of the formula (1) comprise the compounds of the formula (7) 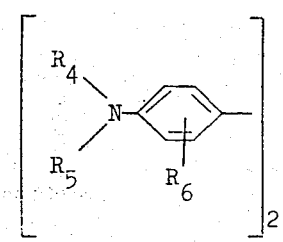

wherein $R_4$, $R_5$ and $R_6$ have the given meanings and $Z_5$ represents 1-phenyl-3-methyl-5-pyrazolonyl, 1-phenyl-3-methyl-5-amino-pyrazolyl, 1-methyl-2,4-dihydroxy-3-quinolinyl, 1-ethyl-2-methyl-3-indolyl, 5,5-dimethyl-1,3-diketo-2-cyclohexyl, acetyl-aceton-3-yl or the residue of acetoacetic acid anilide, bonded via the ketomethylene group.

the leuco methylene dyestuffs of formula (1) and of the subordinate formulae may be produced by conventional methods known in the art. An advantageous procedure to follow is to react 2 mols of an amino substituted benzene compound of the formula (8) 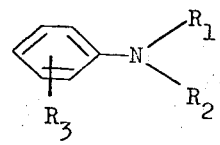 or 2 mols of an indolyl compound of the formula (9) 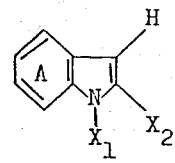

with 1 mol of an aldehyde of the formula $$Z - CHO \qquad (10)$$

wherein A, $R_1$, $R_2$, $R_3$, $X_1$, $X_2$ and Z have the given meanings.

The reaction is advantageously carried out at a temperature of 20° to 150° C, preferably at 80° to 120° C and in the presence of sulphuric acid which is preferably of 70–98%. The reaction time, is dependent upon the temperature and is typically 8–16 hours at 120° C. Alcohols, for example iso-propyl alcohol, may be added to the reaction mixture to assist solubility of the reagents and product, in which case the reaction temperature is between 20° C and the reflux temperature of the mixture. The use of urea is, in some cases, beneficial in accelerating the reaction time and increasing the yield. In place of sulphuric acid may be used hydrochloric acid, zinc chloride, ferric chloride, aluminium chloride, polyphosphoric acid, phosphorus oxychloride, thionyl chloride or phosphorus pentoxide. The use of acetic anhydride both as reagent and solvent is, in many cases, advantageous. The reaction may also be performed in a waterinsoluble solvent using catalytic quantities of an organic sulphonic acid for example, p-toluene sulphonic acid.

the leuco methylene dyestuffs of the formula (1) wherein Z represents the residue of an organic compound having a ketomethylene group, are preferably obtained by reacting according to conventional methods a carbinol compound of the formula

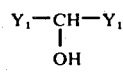 (11)

with an organic compound having a ketomethylene group.

The methylene compounds of formula (1) according to the invention are particularly used as colour formers in combination with further chromogenic compounds. When brought into contact with an acidic coreactant substance that is electron-accepting, images of various colours may be obtained which are stable on exposure to light and do not suffer any significant hue changes.

Typical co-reactants are, for example, attapulgus clay, silton clay, silica, bentonite, halloysite, aluminium oxide, aluminium phosphate, kaolin or any acidic clay, or an acid reacting polymeric material such as phenolic polymer, a phenyl acetlene polymer, a maleic acid rosin resin or a partially or wholly hydrolysed polymer of maleic anhydride with styrene, ethylene, vinyl methyl ether or carboxy polymethylenes. The preferred co-reactants are attapulgus clay, silton clay, silica or a phenol-formaldehyde resin.

By varying the structure of the leuco methylene dyestuffs used according to the invention certain properties may be "built-in", for example, the colour and the fade stability for compatibility in the mixture with the other colour formers and any solubility characteristics which would allow greater flexibility in the choice of solvents used in the various modes of application, especially in the microencapsulation.

The colour formers of formula (1) and the subordinate formulae are used in pressure-sensitive copying and recording material. Such a material includes for instance at least one pair of sheets, which comprises a mixture of at least two colour formers, wherein at least one colour former is of formula (1), and an electron-accepting substance. The colour former mixture is desirably dissolved in an organic solvent, and is preferably contained in pressure rupturable microcapsules.

According to the invention, the leuco methylene dyestuffs are used in admixture with one or more, advantageously with three to five further colour formers. Said further colour formers may be known colour formers such as crystal violet lactone, benzoyl leuco methylene blue, diamino substituted fluorane compounds as described in British Pat. No. 1,182,743 or in the British Patent Application No. 24079/73 equivalent to the Belgian Pat. No. 815,283, or 3-phenyl-3-indolylphthalides as described in British Patent application Nos. 24077/73 or 24080/73 equivalent to the Belgian Pat. Nos. 815,291 and 815,294, respectively, or 3,3-bis-indolylphthalides as described in the published German patent application No. 2,257,711.

The colour formers, upon coming into contact with the electron accepting substance, produce a coloured marking at the points where the pressure is applied.

These colour former mixtures which are comprised in the pressure-sensitive copying material are prevented from becoming active by being separated from the electron accepting substance. This can be done by incorporating the colour formers into a foam-, sponge- or honeycomb-like structure. Preferably however the colour formers are microencapsulated.

When the capsules are ruptured by pressure from e.g. a pencil, and the colour former solution is thus transferred into an adjacent sheet coated with a substrate capable of acting as an electron acceptor, a coloured image is produced. This new colour results from the thus produced dyestuff which absorbs in the visible region of the electronmagnetic spectrum.

The general art of making microcapsules of some character has long been known. Well known methods e.g. are disclosed in U.S. Pat. Nos. 2,183,053, 2,797,201, 2,800,457, 2,800,458, 2,964,331, 3,016,308, 3,171,878, 3,265,630, 3,405,071, 3,418,250, 3,418,656, 3,424,827 and 3,427,250. Further methods are disclosed in British patent Specifications Nos. 989,264 and above all 1,156,725, 1,301,052 1,355,124. Any of these and other methods are suitable for encapsulating the colour formers used according to the invention.

Preferably the colour formers are encapsulated dissolved in organic solvents. Suitable solvents are preferably non-volatile e.g. polyhalogenated diphenyl such as trichlorodiphenyl and its mixture with liquid paraffin, tricresyl phosphate, di-n-butyl phthalate, dioctyl phthalate, trichlorobenzene, nitrobenzene, trichloroethyl-phosphate, petroleum ether, hydrocarbon oils, such as paraffin, alkylated derivatives of naphthalene or diphenyl, terphenyls, partially hydrogenated terphenyls chlorinated or hydrogenated condensed aromatic hydrocarbons. The capsule walls can be obtained by coacervation forces evenly around the droplets of the colour former solution, wherein the encapsulating material may consist of gelatine, as e.g. described in U.S. Pat. No. 2,800,457.

Alternatively, the capsules may be made of aminoplast or modified aminoplasts by polycondensation as described in British patent specification No. 989,264 or 1,156,725.

A preferred arrangement is wherein the encapsulated colour former mixture is coated on the back side of a transfer sheet and the electron accepting substance is coated on the front side of a receiving sheet.

The pressure-sensitive copying material according to the invention may be used for the various types of systems known in the art. The various systems mainly are distinguished by the arrangement of the capsules, the colour reactants and the support material.

As a rule, the microcapsules may be in an undercoating of the upper sheet and the colour reactants, that is the electron acceptor and coupler, may be in the overcoating of the lower sheets. However, the components may also be used in the paper pulp.

Another arrangement we have in the self-contained papers. There the microcapsules containing the colour former and the colour reactants are in or on the same sheet as one or more individual coatings or in the paper pulp.

Such pressure-sensitive copying materials are described e.g. in U.S. Pat. Nos. 3,516,846, 2,730,457, 2,932,582, 3,427,180, 3,418,250 and 3,418,656. Further systems are disclosed in British patent specification Nos. 1,042,596, 1,042,597, 1,042,598, 1.042,599, 1.053,935, and 1,517,650.

Microcapsules containing the colour former mixtures according to the invention are suitable for any of these and other systems.

The capsules are preferably fixed to the carrier by means of a suitable adhesive. Since paper is the preferred carrier material, these adhesives are predominantly paper coating agents, such as e.g. gum arabic, polyvinyl alcohol, hydroxymethylcellulose, casein, methylcellulose or dextrin.

In the present application, the definition "paper" not only includes normal papers from cellulose fibres, but also papers in which the cellulose fibres are replaced (partially or completely) by synthetic fibres of polymers.

The following non-limitative examples illustrate the present invention. Percentages are expressed by weight unless otherwise stated.

EXAMPLE 1

A solution containing 1.32 g Crystal Violet Lactone, 0.31 g 3,3-bis-(1'-octyl-2'-methylindol-3'-yl)-phthalide, 0.62 g 2-octylamino-6-diethylaminofluoran, 0.35 g Benzoyl Leuco Methylene Blue, 0.28 g of a compound of the formula (10)

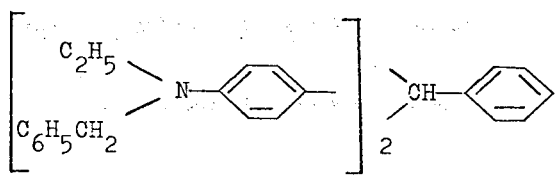

and 0.26 g of a compound of the formula (11)

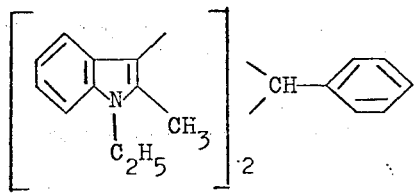

in 100 g of hydrogenated diphenyl is emulsified at 50° C in 100 g of 12% pigskin gelatine solution. 100 g of 12% gum arabicum solution is added followed by 200 ml of water at 50° C. The emulsion is poured into 600 g ice-water and stirred for three hours to complete the coacervation. The pH is adjusted to 9. The resulting capsule slurry is coated onto paper and dried. When the coated side is placed in contact with a second sheet coated with silton clay or attapulgite clay a dark blue image is obtained after application of pressure by writing. The image thus obtained is stable on exposure to light and does not suffer any significant hue changes.

EXAMPLE 2

A solution containing 1.22 g Crystal Violet Lactone, 0.28 g 3,3-bis-(1'-octyl-2'-methylindol-3'-yl)-phthalide, 0.73 g 2-octylamino-6-diethylaminofluoran and 0.81 g of a compound of the formula (12)

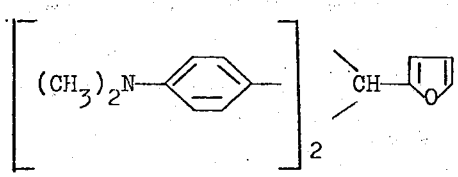

in 100 g of hydrogenated terphenyl is emulsified at 50° C in 100 g of 12% pigskin gelatine solution. 100 g of 12% gum arabic solution is added followed by 200 ml of water at 50° C. The emulsion is pourred into 600 g ice-water and stirred for three hours to complete the coacervation. The pH is adjusted to 9. The resulting capsule slurry is coated onto paper and dried. When the coated side is placed in contact with a second sheet coated with silton clay or attapulgite clay a dark blue image is obtained after application of pressure by writing. The image thus obtained is stable on exposure to light and does not suffer any significant hue changes. Furthermore the sheets coated with microcapsules do not develop any trace of blue colouration when exposed for long periods to light.

EXAMPLE 3

A solution containing 1.5 g CRystal Violet Lactone, 0.35 g 3,3-bis-(1'-octyl-2'-methylindol-3'-yl) phthalide, 0.9 g 2-octylamino-6-diethylaminofluoran and 0.4 g of a compound of the formula (13)

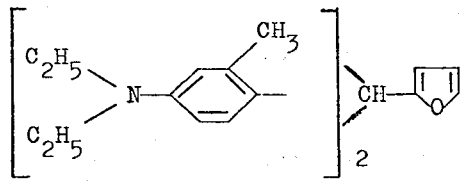

in 100 g of hydrogenated terphenyl is emulsified at 50° C in 100 g of 12% pigskin gelatine slution. 100 g of 12% gum arabic solution is added followed by 200 ml of water at 50° C. The emulsion is poured into 600 g ice-water and stirred for three hours to complete the coacervation. The pH is adjusted to 9. The resulting capsule slurry is coated onto paper and dried. When the coated side is placed in contact with a second sheet coated with silton clay or attapulgite clay a dark blue image is obtained after application of pressure by writing. The image thus obtained is stable on xposure to light and does not suffer any significant hue changes. Furthermore the sheets coated with microcapsules do not develop any trace of blue colouration when exposed for long periods to light.

The Examples 1 to 3 have been specially formulated to produce balanced mixtures of colour formers in such relative proportions as to produce particular coloured images having good fade stability. In a similar way any of the compounds listed in Tables I to IV may be formulated together with any other known colour formers such as Crystal Violet Lactone,
2-dibenzylamino-6-diethylamino-fluoran,
2-n-octylamino-6-diethylamino-fluoran,
2-dibenzylamino-6-pyrrolidinyl-fluoran,
lactone of 7-dimethylamino-4-o-carboxyphenyl-4-hydroxy-1-phenyl-3-methyl-chromenopyrazole,
3,3-bis-(1'-octyl-2'-methyl-indol-3-yl)phthalide or
3,3-bis-(1-octyl-2'-methyl-indol-3-yl)-tetrachloro phthalide,
to produce a wide range of hues. The data listed in the Tables is that of the colour formers when applied as solutions in hydrogenated terphenyl to papers coated with attapulgus and silton clays.

the compounds listed in Table III are especially stable to light and air in the absence of an electron-accepting co-reactant.

Table I $$\left[\begin{array}{c}R_8\\R_9\end{array}N-\phenyl-\right]_2=CH-Z_5 \quad (14)$$

| Formula No. | $R_8$ | $R_9$ | $Z_5$ | Attapulgite clay Colour | $\lambda_1$ | $\lambda_2$ | Silton clay Colour | $\lambda_1$ | $\lambda_2$ |
|---|---|---|---|---|---|---|---|---|---|
| 10 | $C_2H_5$ | $-CH_2-$phenyl | phenyl | green | 626 | 420 | green | 431 | 425 |
| 15 | $CH_3$ | $CH_3$ | phenyl | green | 635 | 415 | green | 643 | 433 |
| 16 | $C_2H_5$ | $C_2H_5$ | phenyl | green | 636 | 415 | green | 643 | 432 |
| 17 | $CH_3$ | $CH_3$ | 2-$CH_3$-phenyl | turquoise | 628 | 412 | turquoise | 633 | 416 |
| 18 | $CH_3$ | $CH_3$ | 3-$CH_3$-phenyl | green | 626 | 420 | green | 633 | 427 |
| 19 | $CH_3$ | $CH_3$ | 4-$CH_3$-phenyl | green | 626 | 439 | green | 628 | 440 |
| 20 | $CH_3$ | $CH_3$ | 2-$OCH_3$-phenyl | green | 637 | 430 | green | 638 | 434 |
| 21 | $CH_3$ | $CH_3$ | 3-$OCH_3$-phenyl | green | 633 | 425 | green | 636 | 426 |
| 22 | $CH_3$ | $CH_3$ | 4-$OCH_3$-phenyl | green | 618 | 463 | green | 620 | 462 |
| 23 | $CH_3$ | $CH_3$ | 4-F-phenyl | green | 635 | 425 | green | 634 | 428 |
| 24 | $CH_3$ | $CH_3$ | 4-Cl-phenyl | green | 638 | 430 | green | 640 | 430 |
| 25 | $CH_3$ | $CH_3$ | 4-Br-phenyl | green | 641 | 426 | green | 639 | 430 |
| 26 | $CH_3$ | $CH_3$ | 2-$NO_2$-phenyl | green | 650 | 390 | green | 650 | 405 |
| 27 | $CH_3$ | $CH_3$ | 3-$NO_2$-phenyl | green | 632 | 365 | green | 626 | 400 |
| 28 | $CH_3$ | $CH_3$ | 4-$NO_2$-phenyl | green | 650 | 426 | green | 658 | 428 |
| 29 | $CH_3$ | $CH_3$ | 3,4-di-$OCH_3$-phenyl | green | 615 | 472 | green | 620 | 478 |
| 30 | $CH_3$ | $CH_3$ | 2,4-di-Cl-phenyl | green | 650 | 425 | green | 647 | 425 |

Table I-continued $$\left[\begin{array}{c} R_8 \\ R_9 \end{array}\!\!N-\!\!\!\bigcirc\!\!\!-\right]_2\!\!=CH-Z_5 \quad (14)$$

| | | | | Attapulgite clay | | | Silton clay | | |
|---|---|---|---|---|---|---|---|---|---|
| Formula No. | $R_8$ | $R_9$ | $Z_5$ | Colour | $\lambda_1$ | $\lambda_2$ | Colour | $\lambda_1$ | $\lambda_2$ |
| 31 | CH₃ | CH₃ | naphthyl | green | 638 | 445 | green | 640 | 445 |
| 32 | —CH₂—C₆H₅ | —CH₂—C₆H₅ | naphthyl | green | 642 | 470 | green | 640 | 440 |
| 33 | CH₃ | CH₃ | methylenedioxyphenyl | green | 628 | 480 | green | 633 | 480 |
| 34 | CH₃ | CH₃ | thienyl | green | 638 | 465 | green | 640 | 466 |
| 35 | —CH₂—C₆H₅ | —CH₂—C₆H₅ | thienyl | blue | 632 | 486 | blue | 634 | 495 |
| 36 | CH₃ | —CH₃ | pyridyl | green | 650 | 400 | green | 658 | 414 |
| 37 | CH₃ | CH₃ | indolyl | violet | 578 | — | violet | 586 | — |

Table II $$\left[\begin{array}{c}\text{indole with } X_8\\X_7\end{array}\right]_2\!\!=CH-Z_6 \quad (38)$$

| | | | | Attapulgite clay | | | Silton clay | | |
|---|---|---|---|---|---|---|---|---|---|
| Formula No. | $X_7$ | $X_8$ | $Z_6$ | Colour | $\lambda_1$ | $\lambda_2$ | Colour | $\lambda_1$ | $\lambda_2$ |
| 11 | —C₂H₅ | —CH₃ | phenyl | red | 543 | 400 | red | 540 | — |
| 39 | H | —CH₃ | phenyl | red | 534 | 400 | pink | 532 | 403 |
| 40 | —C₃H₇ | phenyl | phenyl | green | 405 | 604 | green | 418 | 602 |
| 41 | —C₈H₁₇ | —CH₃ | phenyl | red | 546 | 400 | red | 548 | 405 |
| 42 | —CH₂—C₆H₅ | —CH₃ | phenyl | red | 548 | 404 | red | 542 | 410 |

Table II-continued $$\left[\begin{array}{c}\text{indole-}X_8 \\ X_7\end{array}\right]_2 = CH - Z_6 \quad (38)$$

| Formula No. | $X_7$ | $X_8$ | $Z_6$ | Attapulgite clay Colour | $\lambda_1$ | $\lambda_2$ | Silton clay Colour | $\lambda_1$ | $\lambda_2$ |
|---|---|---|---|---|---|---|---|---|---|
| 43 | $-C_2H_5$ | $-CH_3$ | 2-methylphenyl | red | 537 | — | red | 535 | — |
| 44 | $-C_2H_5$ | $-CH_3$ | 3-methylphenyl | red | 541 | — | red | 543 | — |
| 45 | $-C_2H_5$ | $-CH_3$ | 4-methylphenyl | red | 544 | 405 | red | 540 | 410 |
| 46 | $-C_2H_5$ | $-CH_3$ | 2-methoxyphenyl | red | 542 | — | red | 540 | — |
| 47 | $-C_2H_5$ | $-CH_3$ | 3-methoxyphenyl | red | 540 | — | red | 540 | — |
| 48 | $-C_2H_5$ | $-CH_3$ | 4-methoxyphenyl | orange | 540 | 436 | orange | 536 | 444 |
| 49 | $-C_2H_5$ | $-CH_3$ | 4-fluorophenyl | red | 548 | — | red | 550 | — |
| 50 | $-C_2H_5$ | $-CH_3$ | 4-chlorophenyl | pink | 534 | 400 | pink | 532 | 404 |
| 51 | $-C_2H_5$ | $-CH_3$ | 4-bromophenyl | red | 548 | 400 | red | 550 | 405 |
| 52 | $-C_6H_{13}$ | H | phenyl | pink | 529 | 397 | pink | 528 | — |
| 53 | $-C_2H_5$ | $CH_3$ | 4-nitrophenyl | violet | 560 | — | violet | 500 | — |
| 54 | $-C_2H_5$ | $CH_3$ | 3,4-dimethoxyphenyl | red | 536 | — | orange | 485 | — |
| 55 | $-C_2H_5$ | $CH_3$ | 3,4-dichlorophenyl | violet | 555 | — | violet | 560 | — |
| 56 | $-C_2H_5$ | $CH_3$ | thienyl | red | 553 | 445 | orange | 550 | 448 |
| 57 | $-C_2H_5$ | $CH_3$ | 3,4-methylenedioxyphenyl | red | 542 | 465 | red | 540 | 490 |

Table III $$Y_2-CH-Y_2 \quad (58)$$
$$Z_7$$

| Formula No. | $Y_2$ | $Z_7$ | Attapulgite clay Colour | $\lambda_1$ | $\lambda_2$ | Silton clay Colour | $\lambda_1$ | $\lambda_2$ |
|---|---|---|---|---|---|---|---|---|
| 12 | 4-N(CH$_3$)$_2$-phenyl | furyl | blue/black | 616 | 575 | dark blue | 618 | 580 |
| 13 | 4-N(C$_2$H$_5$)$_2$-3-CH$_3$-phenyl | furyl | turquoise blue | 638 | 400 | turquoise blue | 636 | — |
| 59 | 4-NHC$_2$H$_5$-3-OCH$_3$-phenyl | phenyl | green | 400 | 630 | green | 630 | 414 |
| 60 | 3-N(CH$_3$)$_2$-4-Cl-phenyl | phenyl | green | 616 | 424 | green | 609 | 424 |
| 61 | 4-N(CH$_2$-phenyl)$_2$-phenyl | phenyl | green | 625 | 420 | green | 632 | 438 |
| 62 | 4-N(CH$_2$-phenyl)$_2$-phenyl | 3,4-methylenedioxyphenyl | blue | 621 | 516 | blue | 622 | 512 |
| 63 | 1-C$_2$H$_5$-2,3-dimethylindol-3-yl | 2-NO$_2$-phenyl | orange | 544 | — | orange | 496 | — |
| 64 | 1-C$_2$H$_5$-2,3-dimethylindol-3-yl | 3-NO$_2$-phenyl | violet | 558 | — | violet | 558 | — |
| 65 | 1-C$_2$H$_5$-2,3-dimethylindol-3-yl | —CH=CH—phenyl | violet | 542 | — | violet | 500 | 540–600 |
| 66 | 1-C$_2$H$_5$-2,3-dimethylindol-3-yl | 1-CH$_3$-pyrrol-2-yl | orange | 490 | — | orange | 490 | — |
| 67 | 1-C$_2$H$_5$-2,3-dimethylindol-3-yl | pyridyl | violet | 562 | — | violet | 564 | — |
| 68 | 1-C$_2$H$_5$-2,3-dimethylindol-3-yl | 1-COCH$_3$-2-methylindol-3-yl | orange | 485 | — | orange | 500 | — |

Table IV $$Y_2-\underset{Z_7}{CH}-Y_2 \quad \text{Silton clay}$$

| Formula No. | $Y_2$ | $Z_7$ | Colour | $\lambda_1$ | $\lambda_2$ |
|---|---|---|---|---|---|
| 69 | —⟨⟩—N(CH₃)₂ | 2,3-dimethyl-1-ethylindolyl | blue | 614 | 575 |
| 70 | —⟨⟩—N(CH₃)₂ | 3-methyl-1-phenyl-5-oxo-pyrazolyl | blue | 616 | 580 |
| 71 | —⟨⟩—N(CH₃)₂ | 4-amino-3-methyl-1-phenyl-pyrazolyl | blue | | |
| 72 | —⟨⟩—N(CH₃)₂ | 4-hydroxy-1,3-dimethyl-2-oxo-quinolyl | blue | 616 | 573 |
| 73 | —⟨⟩—N(CH₃)₂ | 2,2,4-trimethyl-1,3-dioxocyclohexyl | blue | 616 | 575 |
| 74 | —⟨⟩—N(CH₃)₂ | —CH(COCH₃)₂ | blue | 616 | 573 |
| 75 | —⟨⟩—N(CH₃)₂ | —CH(COCH₃)—CONH—⟨⟩ | blue | 616 | 578 |

We claim:

1. A pressure-sensitive recording material comprising at least one pair of paper sheets containing at least two color formers, dissolved in an organic solvent, and an electron-accepting substance wherein at least one colour former is a leuco methylene dyestuff of the formula $$Y-\underset{Z}{CH}-Y \quad (1)$$

wherein Y represents an amino-substituted phenyl residue of the formula

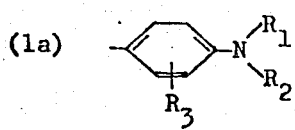

(1a)

or an indolyl residue of the formula

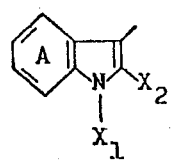

1(b)

wherein $R_1$ and $R_2$, independently of the other represent hydrogen, alkyl with 1 to 12 carbon atoms, alkoxyalkyl with 2 to 8 carbon atoms, benzyl or phenyl, $R_3$ is hydrogen, halogen, nitro, alkyl having 1 to 4 carbon atoms or alkoxy having 1 to 4 carbon atoms, $X_1$ represents hydrogen, alkyl with 1 to 12 carbon atoms, alkenyl with at most 12 carbon atoms or benzyl, $X_2$ represents hydrogen, alkyl with 1 to 12 carbon atoms or phenyl and the ring A is unsubstituted or substituted by cyano, nitro, halogen, alkyl having 1 to 4 carbon atoms, alkoxy having 1 to 4 carbon atoms or acyl with 1 to 8 carbon atoms, and Z represents alkyl with 1 to 12 carbon atoms, alkenyl with at most 12 carbon atoms, aryl, aralkyl, an heterocyclic radical or the residue of an organic, particularly aliphatic or cycloaliphatic compound having a ketomethylene group and the other colour former is selected from the group consisting of crystal violet lactone, benzoyl leuco methylene blue, diamino substituted fluoran compounds, 3-phenyl-3-indolylphthalides or 3,3-bis-indolylphthalides or their mixtures thereof.

2. A pressure-sensitive recording material according to claim 1, wherein at least one leuco methylene dyestuff is of the formula

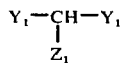 (2)

wherein $Y_1$ represents an amino-substituted phenyl residue of the formula (2a) 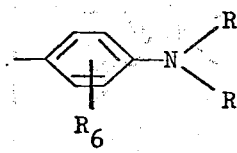 or and indolyl residue of the formula (2b) 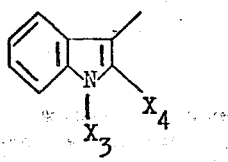

wherein $R_4$ and $R_5$ independently of the other, represent hydrogen, alkyl having 1 to 4 carbon atoms or benzyl, $R_6$ is hydrogen, methyl, methoxy or chlorine, $X_3$ represents hydrogen, alkyl with 1 to 12 carbon atoms or benzyl, $X_4$ represents hydrogen, methyl, ethyl or phenyl, $Z_1$ represents an aralkyl radical selected from benzyl, piperonyl and styryl, an aryl radical selected from phenyl, diphenyl or naphthyl which aryl radical is unsubstituted or substituted by halogen, methylenedioxy, nitro, alkyl having 1 to 4 carbon atoms, alkoxy having 1 to 4 carbon atoms or by dialkylamino having 1 to 4 carbon atoms per each alkyl part; a heterocyclic radical selected from furyl, thienyl, pyrrolyl, 5-aminopyrazolyl, 5-pyrazolonyl, triazolyl, pyridyl, thiazinyl, oxazinyl, indolyl, indazolyl, benzothienyl, benzothiazolyl, benzotriazolyl, naphthotriazolyl, 2,4-dihydroxyquinolyl, carbazolyl, phenothiazinyl or phenoxazinyl, said mono- or polynuclear heterocycle is unsubstituted or substituted by halogen, cyano, nitro, alkyl with 1 to 8 carbon atoms, alkoxy with 1 to 4 carbon atoms, alkanoyl having 2 to 4 carbon atoms or by phenyl, or the residue of an open or cyclic 1,3-diketone or of an acyl acetic phenylamide, bonded via the ketomethylene group.

3. A pressure-sensitive recording material according to claim 2, wherein $Z_1$ represents a
1-phenyl-3-methyl-5-pyrazolonyl
1-phenyl-3-methyl-5-aminopyrazolyl or
1-methyl-2,4-dihydroxy-quinolinyl group,
an indolyl radical substituted by alkanoyl having 2 to 4 carbon atoms or by alkyl having 1 to 8 carbon atoms, or the residue of an open or cyclic 1,3-diketone or of an acyl acetic acid phenylamide, bonded via the ketomethylene group.

4. A pressure-sensitive recording material according to claim 2, wherein at least one leuco methylene dyestuff is of the formula (3) 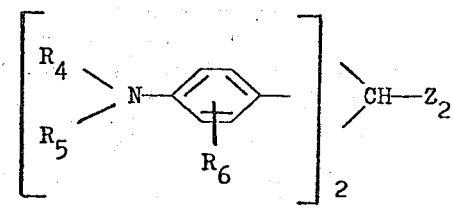

wherein $Z_2$ represents styryl, methylenedioxyphenyl, naphthyl or the group

wherein $R_7$ represents hydrogen, halogen, nitro, methyl or methoxy, and $R_6$ and $R_7$ do not simultaneously represent hydrogen when $R_4$ and $R_5$ are methyl.

5. A pressure-sensitive recording material according to claim 4, wherein $R_4$ and $R_5$ are methyl, ethyl or benzyl and $Z_2$ represents methylphenyl, methoxyphenyl, nitrophenyl, 3,4-methylenedioxyphenyl, or also a phenyl group provided that $R_4$ and $R_5$ are not methyl and $R_6$ is not hydrogen.

6. A pressure-sensitive recording material according to claim 2, wherein at least one leuco methylene dyestuff is of the formula (4) 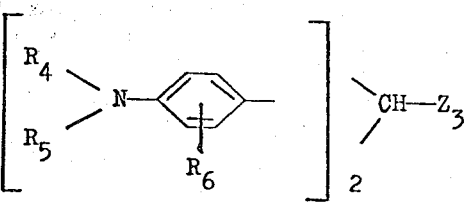

wherein $Z_3$ represents furyl, thienyl, pyridyl, pyrrolyl or indolyl, wherein the pyrrolyl radical is unsubstituted or substituted by alkyl having 1 to 4 carbon atoms and the indolyl radical is unsubstituted or substituted by alkyl having 1 to 4 carbon atoms, alkoxy having 1 to 4 carbon atoms, alkanoyl having 2 to 4 carbon atoms or phenyl.

7. A pressure-sensitive recording material according to claim 6, wherein $R_4$ and $R_5$ are hydrogen, methyl, ethyl or benzyl and $Z_3$ represents furyl, thienyl, pyridyl, N-methylpyrrolyl, indolyl, 1-acetyl-indolyl or 1-ethyl-2-methylindolyl.

8. A pressure-sensitive recording material according to claim 6, wherein $R_4$ and $R_5$ both are methyl or ethyl, $R_6$ is hydrogen or methyl and $Z_3$ represents furyl.

9. A pressure-sensitive recording material according to claim 2, wherein at least one leuco methylene dyestuff is of the formula (5) 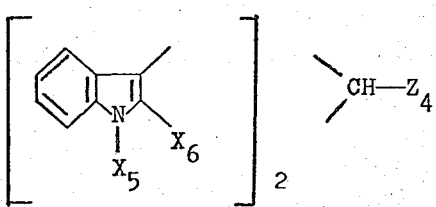

wherein $X_5$ represents alkyl with 2 to 8 carbon atoms or benzyl, $X_6$ represents methyl or phenyl and $Z_4$ represents styryl, phenyl or naphthyl, said phenyl radical is unsubstituted or substituted by halogen, methylenedioxy, nitro, methyl or methoxy.

10. A pressure-sensitive recording material according to claim 9, wherein $Z_4$ is phenyl, methylphenyl, methoxyphenyl, nitrophenyl or styryl.

11. A pressure-sensitive recording material according to claim 10, wherein $X_5$ represents ethyl, $X_6$ represents methyl and $Z_4$ represents phenyl or methoxyphenyl.

12. A pressure-sensitive recording material according to claim 2, wherein at least one leuco methylene dyestuff is of the formula (6) 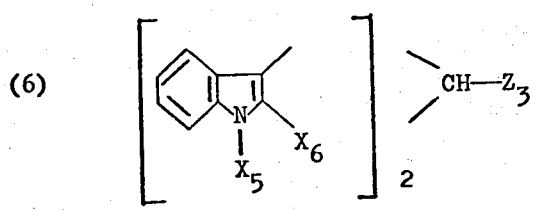

wherein $X_5$ represents alkyl with 2 to 8 carbon atoms or benzyl, $X_6$ represents methyl or phenyl and $Z_3$ represents furyl, thienyl, pyridyl, pyrrolyl or indolyl, wherein the pyrrolyl radical is unsubstituted or substituted by alkyl having 1 to 4 carbon atoms and the indolyl residue is unsubstituted or substituted by alkyl having 1 to 4 carbon atoms, alkoxy having 1 to 4 carbon atoms, alkanoyl having 2 to 4 carbon atoms or phenyl.

13. A pressure-sensitive recording material according to claim 12, wherein $X_5$ is ethyl, $X_6$ is methyl and $Z_3$ represents furyl, pyridyl, N-methyl-pyrrolyl, indolyl or 1-acetyl-indolyl.

14. A pressure-sensitive recording material according to claim 12, wherein $X_5$ is ethyl, $X_6$ is methyl and $Z_3$ represents 1-acetyl-3-indolyl.

15. A pressure-sensitive recording material according to claim 2, wherein at least one leuco methylene dyestuff is of the formula (7) 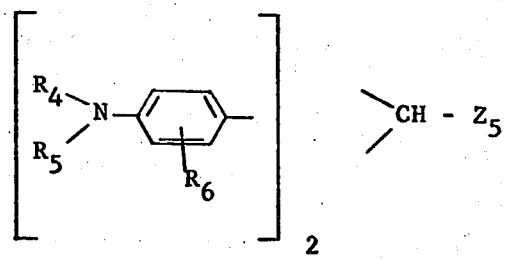

wherein $Z_5$ represents 1-phenyl-3-methyl-5-pyrazolonyl, 1-phenyl-3-methyl-5-aminopyrazolyl, 1-methyl-2,4-dihydroxy-3-quinolinyl, 1-ethyl-2-methyl-3-indolyl, 5,5-dimethyl-1,3-diketo-2-cyclohexyl, acetyl-aceton-3-yl or the residue of acetoacetic acid anilide bonded via the ketomethylene group.

* * * * *

UNITED STATES PATENT AND TRADEMARK OFFICE
CERTIFICATE OF CORRECTION

PATENT NO. : 3,995,088
DATED : November 30, 1976
INVENTOR(S) : ROBERT GARNER ET AL.

It is certified that error appears in the above–identified patent and that said Letters Patent are hereby corrected as shown below:

Column 19, claim 1, line 55, delete the formula as it now reads and insert $$--- \quad Y-\underset{\underset{Z}{|}}{CH}-Y \quad ---.$$

Column 21, claim 2, line 25, delete "and" and insert --- an ---.

Signed and Sealed this

Twenty-second Day of March 1977

[SEAL]

Attest:

RUTH C. MASON
*Attesting Officer*

C. MARSHALL DANN
*Commissioner of Patents and Trademarks*